(12) United States Patent
Gambarelli et al.

(10) Patent No.: US 7,608,297 B2
(45) Date of Patent: Oct. 27, 2009

(54) PROCEDURE FOR THE REALISATION OF CERAMIC MANUFACTURES, IN PARTICULAR, PORCELAIN STONEWARE TILES AND TRIM PIECES, WITH ANTI POLLUTION AND ANTI-BACTERIAL PROPERTIES AND PRODUCTS THEREBY OBTAINED

(75) Inventors: Ivana Commendator Gambarelli, Solignano (IT); Giuseppe Pozzi, Solignano (IT)

(73) Assignee: Ceramiche Di Siena S.p.a., Buonconvento (Siena) (IT)

( * ) Notice: Subject to any disclaimer, the term of this patent is extended or adjusted under 35 U.S.C. 154(b) by 338 days.

(21) Appl. No.: 10/554,167

(22) PCT Filed: Apr. 21, 2004

(86) PCT No.: PCT/EP2004/004197

§ 371 (c)(1),
(2), (4) Date: Oct. 21, 2005

(87) PCT Pub. No.: WO2004/094341

PCT Pub. Date: Nov. 4, 2004

(65) Prior Publication Data

US 2007/0009765 A1    Jan. 11, 2007

(30) Foreign Application Priority Data

Apr. 23, 2003  (IT) .............................. MO03A0117

(51) Int. Cl.
*B05D 7/00* (2006.01)
*B05D 3/10* (2006.01)

(52) U.S. Cl. ..................... 427/218; 427/372.2; 427/429
(58) Field of Classification Search ............. 427/372.2, 427/199, 376.2, 164, 165, 166, 167, 255, 427/96, 218; 428/409, 404, 653, 207, 208, 428/411.1, 34.4, 44, 77, 357, 451, 461, 475.8, 428/483, 518, 242, 426, 432, 457, 901, 325, 428/428

See application file for complete search history.

(56) References Cited

U.S. PATENT DOCUMENTS

| | | | | | |
|---|---|---|---|---|---|
| 3,865,778 | A | * | 2/1975 | Christie | 523/212 |
| 4,267,209 | A | * | 5/1981 | Hanson | 427/199 |
| 4,980,246 | A | * | 12/1990 | Negas et al. | 428/702 |
| 5,409,777 | A | * | 4/1995 | Kennedy et al. | 428/411.1 |
| 5,585,153 | A | * | 12/1996 | Kamen et al. | 428/35.7 |
| 6,001,494 | A | * | 12/1999 | Kuchinski et al. | 428/653 |
| 6,103,363 | A | * | 8/2000 | Boire et al. | 428/325 |
| 6,881,483 | B2 | * | 4/2005 | McArdle et al. | 428/403 |
| 2001/0036897 | A1 | * | 11/2001 | Tsujimichi et al. | 502/1 |
| 2002/0045010 | A1 | * | 4/2002 | Rohrbaugh et al. | 427/372.2 |

* cited by examiner

*Primary Examiner*—Timothy M Speer
*Assistant Examiner*—Lauren Robinson
(74) *Attorney, Agent, or Firm*—Thomas R Vigil

(57) ABSTRACT

This invention falls into the field of ceramic manufactures, in particular tiles and trim pieces made of porcelain stoneware. Titanium dioxide is applied to the glaze and to the layer covering the tiles so that a photocatalytic oxidization action can be produced acting against the polluting and bacterial agents present in the atmosphere.

2 Claims, No Drawings

PROCEDURE FOR THE REALISATION OF CERAMIC MANUFACTURES, IN PARTICULAR, PORCELAIN STONEWARE TILES AND TRIM PIECES, WITH ANTI POLLUTION AND ANTI-BACTERIAL PROPERTIES AND PRODUCTS THEREBY OBTAINED

TECHNICAL FIELD

The invention relates to a procedure for the realisation of ceramic manufactures, in particular, porcelain stoneware, single-fired, monoporous or double-fired tiles and trims pieces with anti-pollution properties and products thereby obtained.

BACKGROUND ART

For some time now, it has been common practice to produce manufactures with anti-bacterial and anti-pollution properties destined for the building industry with a wide range of applications such as, construction conglomerates, panelling for road networks and self-locking blocks for paving.

These manufactures are constituted, substantially, of a cement-based conglomerate whose mass contains particles of titanium dioxide, $TiO_2$, a property of which is its capacity to reduce the polluting agents present in the surrounding air.

Of these polluting agents, particular attention should be focussed on the polycyclic aromatic hydrocarbons (PAH) derived from the incomplete combustion of organic materials, wood, coal, oil, and its derivatives, and also the nitrogen oxides (NOx) present in the exhaust fumes from heating systems, industrial plants, motor vehicles, industrial wastes and pesticides. The abatement of the level of environmental NOx reduces both the possibility of acid rain and the presence of nitrates which are harmful to humans and vegetation. The bacteria which can be attacked by the presence of $TiO_2$ include, for example, *Staphylococci* and *Escheria Coli*. This result is due to the fact that the ultraviolet radiation of solar light, together with the humidity, interacts with the titanium dioxide particles, leading to the production of active oxygen which effectively oxidises the aforesaid polluting and bacterial agents present in the atmosphere. The products of the aforesaid oxidisation are removed by water, either rainwater or washing water, and also by the alkaline nature of the cement conglomerates which, until now, have been realised with photocatalytic properties. Moreover, the aforesaid removal and elimination of the polluting products prevent their stagnation on the surface of the said manufactures, ensuring the original colours and their attractive appearance are maintained over time.

The drawback of the commonly-known manufactures with photocatalytic properties lies in the cement base of the said products which cause the said manufactures to have a rough surface and, consequently, limited possibility of high quality aesthetic variants and, consequently, limited possibility of application in the field of external wall coverings for the building industry.

Much higher aesthetic quality, for external wall coverings, is offered by manufactures of a ceramic nature, in particular porcelain stoneware tiles or those made of other pastes, such as single-fired or monoporous materials; however, until now, as far as the applicant is aware, no such material has been realised with polluting and antibacterial agent abatement properties. The main reason for this lies in the fact that the production of ceramic tiles requires firing treatments involving extremely high temperatures which, in the case of the porcelain stoneware manufactures, reach 1,200° C., unlike the production cycle of cement-based manufactures, which are produced by mixing and subsequent compaction, without requiring any thermal treatments.

It is known that when the $TiO_2$ in the form of Anatase reaches 900° C., it is transformed entirely into Rutile, which, it has been demonstrated through experimentation, to be less effective than Anatase in particularly critical pollution situations such as on roads with a great deal of traffic. Moreover, it has been observed that, in the production phase, the transformation of Anatase into Rutile gives the glaze on ceramic manufactures a yellowish colour.

The applicant's studies have concentrated on the way in which the $TiO_2$ can be made to coexist with the aforesaid extremely high temperatures without the decay of its photocatalytic properties, in addition to ensuring the photocatalytic effect of the ceramic tiles obtained in this way do not cause a decline in the high aesthetic quality of the said tiles.

The applicant's research and experiments have lead to different considerations that are analysed hereunder.

The total presence of $TiO_2$ in a finished tile (as a percentage thereof) which provides the best results varies within a range of 1-25% of the total weight of the applications (glazes, silk-screening, engobe, etc.). It should be highlighted that the photocatalytic reaction of the $TiO_2$ to the polluting and bacterial agents does not involve the consumption of the said $TiO_2$, which means the efficacy of its action remains constant over time. It should also be noted that $TiO_2$ can be mixed with both the glaze and the engobe (a covering formed of a thin layer of atomised clay applied to the partially dried clay) and can also be applied with the silk-screening pastes. The effectiveness of the oxidisation exerted by the $TiO_2$ on the bacterial and polluting agents increases in the event that a photo-reflecting layer is applied, either beneath the layer of glaze covering the tile or with the said covering layer; for example, both white pigments and silica particles mixed with the glaze can be used; in this way, the rate at which the solar light penetrates the tiles is increased and this increases the photocatalytic effect exerted by the $TiO_2$.

It is known that $TiO_2$ converts NOx into nitrate ions which, upon oxidisation, become Sodium and Calcium nitrates, which are not noxious, and which precipitate in the form of salts; the latter are removable by simply washing with water. From this came the idea that this washing action would be increased by an increase in the exposed surface, therefore the creation of micro channels on the surface of the tile would facilitate the action of the water (rain water or washing water) when removing the products of the oxidisation caused by the pollutants.

In parallel, it was observed that the increase in the surface exposed to the light increases the photocatalytic effect of $TiO_2$ and therefore it appeared evident to the applicant that it was also necessary to create, on the surface of the tiles, a plurality of non-uniform, micro uneven areas with the dual aim of permitting the solar light to hit the tiles from any direction and permit the air to better fix the NOx which is decomposed by the ultraviolet radiation of the daylight.

To permit an efficacious retaining action of the gas developed during the night, while awaiting the daylight, the need to provide the tiles with materials able to store the said gas was considered. To this end, experimentation showed that the materials that absorb well are Zeolite and Petalite minxed with the glaze, or Magalite added to the traditional clays of which the tile base is composed.

DISCLOSURE OF INVENTION

The aim of this invention is to identify a procedure capable of enabling the production of ceramic manufactures, in particular porcelain stoneware, single-fired, monoporous or double-fired tiles and trim pieces, with photocatalytic properties for the reduction of ambient pollution. In particular, the procedure for the realisation of ceramic manufactures, in particular porcelain stoneware tiles and trim pieces, with anti-pollution properties, in question in this invention, is characterised by the fact that the said procedure, in combination with the production steps usual for the production of traditional ceramics, comprises the following phases:

application of a variable percentage of $TiO_2$ to the manufactures' engobe;

application of a variable percentage of $TiO_2$ to the covering glaze, the silk-screening pastes and the engobe;

application, with the covering layer, of particles of material designed to increase the refraction of the solar light to which the manufactures are exposed;

addition of substances designed to absorb NOx to the covering layer and/or to the material of which the engobe is composed;

creation of micro channels in the covering layer of the ceramic manufactures, said micro channels being designed to increase the permeability to water of the said manufactures;

realisation of micro uneven areas in the aforesaid covering layer, said micro uneven areas being designed to increase the exchange surface between the single manufacture and the atmosphere;

insufflation of air, on certain ramps of the kiln, during the traditional firing at 1200° C.; said insufflation being designed to produce an improvement in the photocatalytic effect of the $TiO_2$.

These and other characteristics will better emerge in the description that follows of a preferred embodiment illustrated, purely in the form of a non-limiting example.

After a first thermal treatment of a traditional type at low temperatures, designed, substantially, to facilitate the evaporation of at least part of the humidity present in the unfired tiles, the procedure continues with the application of the engobe and a glaze in which there is substantially 25% $TiO_2$, preferably in the form of Anatase; this application is carried out, preferably, by means of traditional methods (for example, a disk booth) or by means of airbrushes without air with suitably modified nozzles. There may be Magalite in the engobe.

There is silica sand mixed in with the glaze and, possibly, also white pigments. These materials may also be mixed in with the engobe.

The application of the $TiO_2$ with the covering layer of the tiles, for example the silk-screening layer, envisages a presence of a percentage of the said $TiO_2$, limited to the materials constituting the said layer, which may vary, substantially, from 20% to 100%.

In the said glaze application phase, Zeolite and/or Petalite are added for the purpose of increasing the effect of the Magalite mixed in with the engobe.

Contemporaneously, and also in the aforesaid covering layer, micro channels and uneven areas are produced.

Finally, then, during the application of the covering layer, using silk-screening machines of a commonly known type, four operations are performed contemporaneously by means of the use of four synchronised silicon rollers, in the following order: a first roller creates the micro uneven areas on each tile base, a second roller applies the substance(s) designed to increase the absorption of NOx, a third roller applies the material designed to increase the refraction and a fourth roller compacts everything, redefines the micro uneven areas and produces the micro channels.

At this point, the definitive firing takes place, the said firing being of the traditional type as regards the temperature, which, for porcelain stoneware ceramic material, reaches around 1,200° C., but in the procedure in question in this invention, envisages a modification consisting in an insufflation of air directly into the firing kiln; said insufflation involves the use of a system of shutters positioned directly above the kiln and operated by software which controls, at the same time, the oxidisation, the quantity of $CO_2$ and the $TiO_2$ melting point.

As the last phase of the procedure in question in this invention, a re-firing of the tiles may be effected at approximately 600° C., subject to the application, to the tiles fired the first time, of a thin layer of crystalline containing $TiO_2$.

Over the course of the description, explicit reference has also been made to porcelain stoneware ceramic tiles as the ceramic manufactures, but the procedure in question in this invention can quite evidently also be applied, advantageously, to ceramic tiles of a different type, for example single-fired, monoporous, double-fired, clinker tiles etc.

Moreover, over the course of the description, explicit reference has been made to tiles, but it is evident that the procedure in question in this invention is applicable, advantageously, to any type of ceramic product regardless of the form and dimensions.

The applicant has proceeded with the production of three classes of porcelain stoneware tiles:
 a) a tile without any modifications to the traditional firing and with the presence of $TiO_2$ essentially in the form of Rutile;
 b) a tile obtained with the modification of the firing phase by means of the insufflation of air, intervening during the transformation of Anatase into Rutile;
 c) a tile, as in the previous point, but with the addition of a layer of $TiO_2$ after firing is complete. Tests have also been carried out in which this last typology of tile undergoes a re-firing at 600° C. with the aim of improving the fixing of the $TiO_2$ still further.

The three typologies of tiles just mentioned underwent efficiency tests which lead to the conclusion that 100 $m^2$ of treated tiles, with particular reference to those in typology c), can clean a volume of air of approximately 15,000 $m^3$ during a sunny day.

There will now follow a list of the production characteristics of the five embodiments originating from the aforesaid three tile typologies. A first porcelain stoneware manufacture was obtained with the following production characteristics:
 engobe with 25% $TiO_2$ applied by means of an airbrush without air, functioning under high pressure;
 serigraphy using iron molybdate;
 calcic glaze with 25% $TiO_2$ applied by means of an airbrush without air, functioning under high pressure;
 application of 100% $TiO_2$ by silk-screening.

A second porcelain stoneware manufacture was obtained with the following production characteristics:
 engobe with 25% $TiO_2$ applied by means of a disk booth;
 silk-screening using iron molybdate;
 zinc glaze with 25% $TiO_2$ applied by means of an airbrush without air, functioning under high pressure;
 application of 100% $TiO_2$ by silk-screening.

A third porcelain stoneware manufacture was obtained with the following production characteristics:
- engobe with 25% $TiO_2$ applied by means of a disk booth;
- silk-screening using iron molybdate;
- glossy alkaline silica-boron glaze with 25% $TiO_2$ applied by means of an airbrush without air, functioning under high pressure;
- application of 100% $TiO_2$ by silk-screening.

A fourth porcelain stoneware manufacture was obtained with the following production characteristics:
- engobe with 25% $TiO_2$ applied by means of an airbrush without air, functioning under high pressure;
- silk-screening using iron molybdate;
- glossy silica-boron-zirconium glaze with 25% $TiO_2$;
- application of 100% $TiO_2$ by silk-screening.

A fifth porcelain stoneware manufacture was obtained with the following production characteristics:
- engobe with 25% $TiO_2$ applied by means of an airbrush without air, functioning under high pressure;
- silk-screening using iron molybdate;
- application of 100% $TiO_2$ by means of an airbrush without air, functioning under high pressure;
- application of 100% $TiO_2$ by silk-screening.

The advantage of the procedure in question in this invention consists in the fact that it enables the realisation of ceramic manufactures for finishing in the building industry capable of developing a photocatalytic oxidising action against polluting and bacterial agents.

The invention claimed is:

1. A method for the manufacturing of porcelain stoneware tiles with anti-pollution properties, characterised by the fact that the method comprises the following steps:
   - applying a variable percentage of $TiO_2$ in a covering glaze with a silk-screening paste and engobe finish to a tile to provide a covering layer on the tile;
   - adding particles of material to the covering glaze designed to increase the refraction of the solar light to which the tiles are exposed;
   - adding substances designed to absorb NOx to the covering layer and/or to the material of which the engobe is made;
   - creating micro channels in a thickness of the covering layer of the tile, said micro channels being designed to increase the permeability to water of said tiles;
   - creating micro uneven-areas in the thickness of the aforesaid covering layer, said micro uneven areas being designed to increase the exchange surface between the single tile and the atmosphere;
   - insufflating or blowing air on the covering layer during the traditional firing at 1200° C.; said blowing of air being designed to produce an improvement in the photocatalytic effect of the $TiO_2$, the presence of the $TiO_2$ in the single tile varies from 1% to 25% and is used un the form of anastase, the materials designed to increase the refraction of the solar light to which the tiles are exposed comprise white pigment and particles of silica; said pigments and said silica both being applied to the same ceramic tile, the application of the $TiO_2$ to the covering layer is obtained by means of a brush without air, functioning under high pressure; and the engobe is applied by means of a disk booth, the application of the materials designed to increase the refraction of solar light to which the tiles are exposed is obtained by means of silk-screening machines designed to apply glaze by means of silicone rollers according to the thickness wanted, the substances added to the covering which are designed to facilitate the absorption of the NOx are magalite and one of zeolote or petalite; said magalite is mixed in with the engobe, while the zeolite or petalite are mixed in with the glaze, and the application to the glaze of materials designed to increase the refraction of solar light and of substances designed to absorb NOx, and the creation , also in the covering layer, of micro channels and uneven areas are obtained simultaneously through the use of four synchronized silicon rollers in the following order a first roller creates uneven areas on the base of every single tile, a second roller applies the substance designed to absorb NOx, a third roller applies the material designed to increase the refraction, and a fourth roller compacts everything, redefines the micro uneven areas and produces micro channels.

2. A ceramic tile made according to the method of claim 1.

* * * * *

UNITED STATES PATENT AND TRADEMARK OFFICE
CERTIFICATE OF CORRECTION

| | |
|---|---|
| PATENT NO. | : 7,608,297 B2 |
| APPLICATION NO. | : 10/554167 |
| DATED | : October 27, 2009 |
| INVENTOR(S) | : Ivana Commendator Gambarelli and Giuseppe Pozzi |

It is certified that error appears in the above-identified patent and that said Letters Patent is hereby corrected as shown below:

Column 2, line 65 "minxed" should be --mixed--;

Claim 1, Column 6, line 12 "un" should be --in--.

Signed and Sealed this

Eleventh Day of May, 2010

David J. Kappos
*Director of the United States Patent and Trademark Office*